Patented Aug. 31, 1954

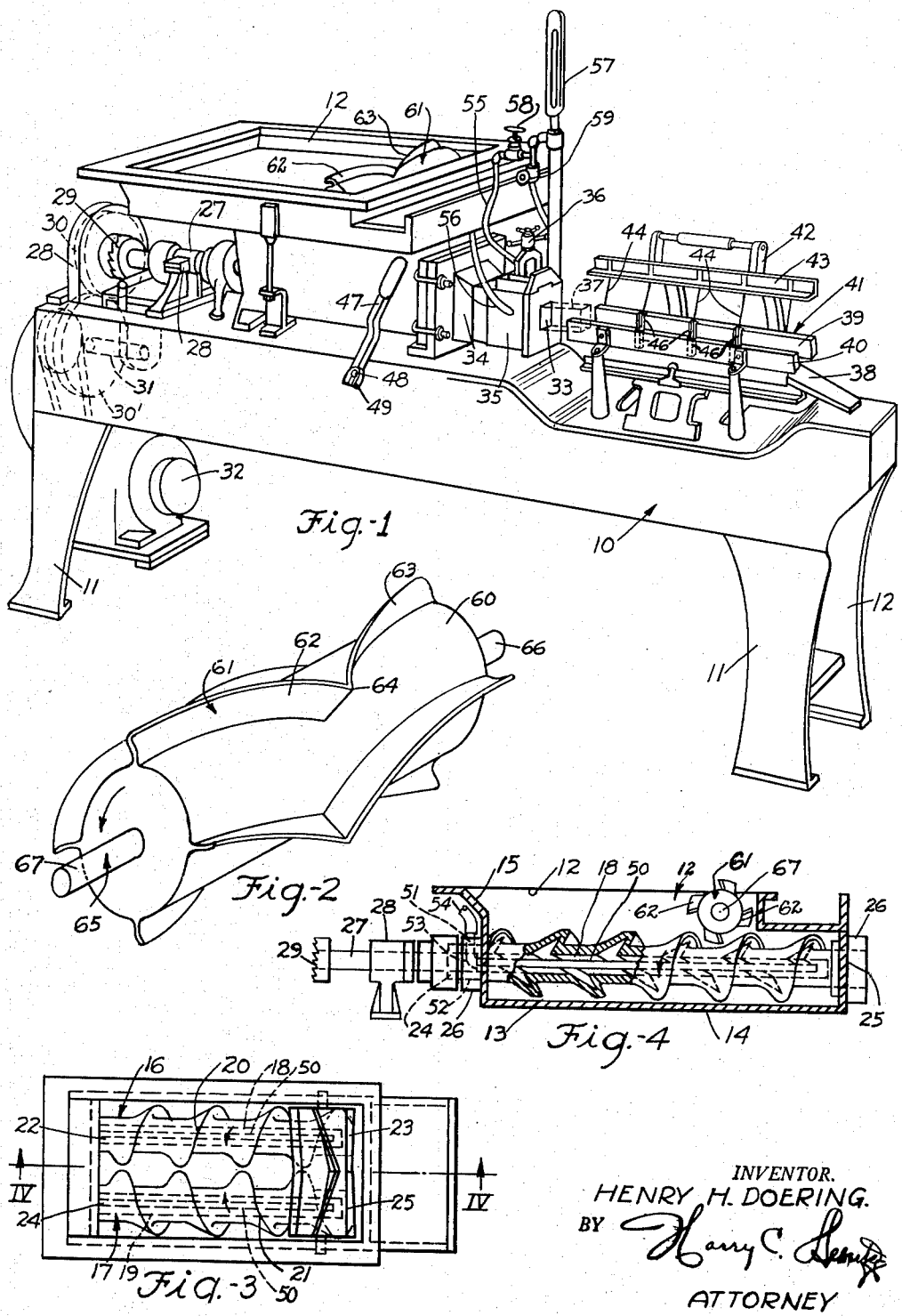

2,687,830

UNITED STATES PATENT OFFICE 2,687,830

FEED ROLLER ATTACHMENT FOR BUTTER PRINT MACHINERY AND THE LIKE

Henry H. Doering, Chicago, Ill.

Application March 25, 1949, Serial No. 83,434

5 Claims. (Cl. 222—227)

This invention relates to an apparatus for extruding plastic substances into polygonal units of varied design, and more particularly to improved substance feeding instrumentalities thereof, although certain features thereof may be employed with equal advantage for other purposes.

It contemplates more especially the provision of improved instrumentalities for forming or converting irregular masses of edible plastics such as oleomargarine, lard, and butter into polygonal units or bricks of one pound, quarter pound, and/or superposed flat slabs capable of convenient severance into palatable segments of pleasing appearance as shown in United States Letters Patent Nos. 1,683,873 and 2,321,188 issued to Doering et al. on September 11, 1928, and June 8, 1943, respectively.

Plastic substance printing machines have been utilized for many years in preforming and controlling the consistency of bulk butter and substitutes therefor. It has been found preferable to employ spiral conveyors in machines of the type illustrated in United States Letters Patent No. 1,683,873, and these are usually water cooled to maintain a proper temperature control, so that the plastic edible material such as butter or butter substitutes will be soft during the processing thereof to prevent undue friction on the working mechanism such as the conveyors and extruding dies, and also permit the complete working of the material for transformation into preformed shapes of the desired consistency and moisture content. This results in a smooth texture and improved quality without impeding the rate of production of prints from bulk irregular masses.

Machines of this general type have presented some difficulty in maintaining the proper supply of edible material to the conveyors as such rotate in the housing that are usually provided with hoppers of different shapes depending upon the substances to be processed. The hoppers are in communication with the conveyor housings for gravity and manual displacement of the edible masses to the conveyors for movement therealong. When the substances stick or accumulate in the hopper, either the attendant would manually displace the edible material sufficient to compact it against the conveyors for engagement therewith or paddles would be employed in the hopper by the attendant to accomplish this same purpose. Sometimes manually operated pivotal blocks would be mounted in the hopper at a point most proximate to the conveyors in order to physically displace the edible material in engagement with the conveyors for movement in response to the rotation thereof.

All of these known methods and expedients require the constant supervision and operation of the attendant, and the initiation and maintenance of a constant supply of edible material in effective engagement with the conveyors. This manual intervention is hapazard in results and constitutes a hazard to the attendant whose hands could be easily caught therein with disastrous effect thereto. These disadvantages have been entirely eliminated and a more effective and uniform feeding of the edible materials within operative reach of the conveyors has been effected with the teachings of the present invention. The known hopper feeder expedients have been replaced with a constantly operating mechanical hopper feeder which is responsive to the rotation of the conveyors. This insures uniformity of operation, synchronized timing, and controlled density of the material with the result that better and more uniform feeding is accomplished without manual intervention. This eliminates all hazard to the attendant, increases production, and results in a much more uniform product.

One object of the present invention is to simplify the construction and improve the operation of devices of the character mentioned.

Another object is to provide a mechanical hopper feed for edible plastic material preforming devices which is in synchronized operation with the conveying mechanism serving as an actuator therefor.

Still another object is to provide a hopper paddle of a rotary type which is operated responsive to the conveyors serving as an actuator therefor.

A further object is to provide a rotary hopper feed in conjunction with and operating responsive to material conveying mechanisms to insure the proper and uniform supply of materials from the hopper to the conveyor.

A still further object is to provide a rotary hopper vane-type feeder which operates in conjunction with spiral conveyors serving as an actuator therefor.

Still a further object is to provide a rotary vane-type paddle for meshing engagement with material conveyors to initiate and maintain a proper supply of materials from the hopper to the conveyors.

An additional object is to provide a spiral conveyor propelled hopper feeder mechanism for bulky masses which are not self-flowing and require initial displacement to a communicating conveyor.

Other objects and advantages will appear from the following description of an illustrative embodiment of the present invention.

In the drawing:

Figure 1 is a perspective view of a machine and hopper feeder embodying features of the present invention.

Figure 2 is a perspective view of a hopper feeder embodying features of the present invention and shown in assembled position in Figure 1.

Figure 3 is a top plan view of a hopper and feeder in conjunction with conveyors that serve as an actuator for the hopper feeder.

Figure 4 is a fragmentary sectional view substantially along line IV—IV of Figure 3.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a frame 10 mounted on suitable corner standards 11 to effect the desired elevation thereof with respect to any suitable foundation or fixed structure. The frame 10 carries a feed trough or hopper 12 for receiving bulk plastic material which is fed into the channel 13 of an elongated cylindrical housing 14 carried by the frame 10 in communication with the hopper 12 through the inclined throat 15.

In order to effect the travel of the plastic material along a predetermined path, a pair of oppositely pitched parallel spiral conveyors 16—17 preferably comprising hollow spindles 18—19 having oppositely pitched spiral fins 20—21 thereon are mounted for rotation in the housing 14. To this end, the extremities 22—23 and 24—25 of the spindles 18—19 are journalled in suitable bearings 26 mounted in the end walls of housing 14.

The conveyors 16—17 are disposed in parallel proximate relation so that the opposite uniform pitch of the spiral fins 21 are at all times in transverse alignment with the space therebetween only sufficiently minute to provide clearance. The spindles 16—17 are properly intergeared so that they will rotate in opposite directions to approach each other. A shaft 27 is threadedly or otherwise secured to the spindle extremity 24 for rotation in spaced bearings 28 fixed to the frame 10. A clutch mechanism 29 is operatively connected to a gear 30 adapted to mesh with a gear pinion 30' mounted on the driving shaft 31 journalled in the frame 10 in the customary manner.

The driving shaft 31 extends longitudinally along the frame 10 for geared connection to any suitable source of power such as an electrical motor 32. Rotation is imparted to the spiral conveyors 16—17 in opposed directions which causes their spiral vanes 20—21 to progressively approach for effecting the travel of the bulk material in the housing 13 through a constriction 33 in communication therewith through the medium of a frusto-conical connecting chamber 34. The constriction 33 is defined in a die 35 which is slidably received therein for attachment thereto by means of an adjusting screw 36. This renders the die 35 replaceable with different forms and shapes of extrusion throats depending upon any particular requirements and the dictates of commercial practice.

As shown, the preformed strip or ribbon of edible material 37 is extruded or issued from the die or throat 33 of the machine for discharge on a cutter member or apron 38 which is arranged to travel between spaced guides 39—40 disposed above the apron 38 to define the path for the extruded plastic material 37. The apron 38 and upstanding guides 39—40 comprise the framework 41 of a transverse cutter or severing device 42. The apron 38 may be lined with a suitable fabric employed to prevent the butter or other edible plastic substance from coming into immediate contact with the cutter framework, thereby preventing the imprint thereof on the bottom surface of the edible plastic kept moist and smooth which serves to seal the pores of the plastic substances to prevent "bleeding."

The cutter frame 41 has the cutter 42 suitably hinged thereto in any suitable manner, there being parallel disposed channel members 43 to which cutting wires 44, in this instance three, are secured for being held taut in severing the extruded mass transversely at predetermined lengths either by manual manipulation or suitable mechanism more fully described in United States Letters Patent Number 1,683,873. To the end of providing for the full severance of the ribbon 37 into units by the wires 44, the guide rails 39—40 have the confronting walls thereof slitted as at 46 to permit the wires 44 to pass completely through the strip or ribbon 37 when the material and the conveyors 16—17 are intermittently and momentarily at rest.

The plastic strip or ribbon 37 issuing from the die 33 of the machine passes onto the apron 38 for movement laterally of the cutting mechanism just described. The swinging movement thereof transversely initiated and controlled by any desired mechanical contrivance or manually will cause the succeeding units of plastic material 37 to be cut into equal prints of predetermined size resulting from the equal spacing of the cutting wires 44, so that either pound prints, half pound prints, quarter pound prints or multiples thereof will be produced depending on the spacing of the wires 44 and the cross-sectional size of the ribbon 37.

The clutch mechanism 29 is controlled by a manually operated lever 47 fulcrumed at 48 on the bracket 49. The lever 47 is controlled by suitable links or levers interposed between the clutch 29 and lever 47, thereby controlling the extrusion of the substance through the die or throat 33. The plastic substance necessarily must be of a soft consistency in order to effect the extrusion and formation thereof into polygonal prints with minimum friction and maximum efficiency. To this end the spiral conveyors or feed screws 16—17 which are preferably chambered throughout their length including the spiral blades 20—21 thereof, provide for the circulation of a tempering solution therethrough for controlling the temperature of the machine elements. The hollow spindle portion of the screw conveyors 16—17 are each provided with a stationary pipe or tube 50 extending lengthwise thereof for axial communication therewith, they being open at the inner end thereof, while the opposite end of the tube is connected with a radially disposed port 51. The port 51 communicates with a chamber or groove on the inner face of the non-rotating collar 52 provided with a feed line or conduit 53 connected with a pipe 54 which leads to a suitable pump (not shown). The pump furnishes a supply of tempering fluid which is caused to circulate through the conveyors or feed screws 16—17 of the machine for discharge through the open end of the tube 50 in each of the conveyor spindles 16—17. The latter are, therefore, filled with tempered water which is allowed to gradually discharge through a suitable orifice in the outer end of the spindle and through the stationary collar 51.

The frusto-conical chamber or delivery head 34 and die housing 35 are likewise chambered to compel the tempering solution to circulate therethrough and provide for the controlled temperature thereof. The tempering solution is supplied to and from the pump source to the chambered delivery head 34 and die housing 35 by means of conduits 55—56 which communicate with a branch of the pipe leading to the pump. A temperature indicator 57 and suitable valves 58—59 control the water tempering influence upon the parts supplied therewith for conduction to the material 37. With this construction it is apparent that a suitable water supply, preferably hot or tempered water, may constantly be kept circulating through the feeding and extruding instrumentalities, especially when the edible plastic substance is in a more or less hard state rendering it difficult to properly extrude and blend the ingredients of the material. This circulation of the tempering solution softens the plastic substance to such an extent as to reduce friction with the feed mechanism which kneads the material without any appreciable moisture loss while extruding such in the desired form or shape.

In order to assure a uniform supply of irregular masses of edible plastic substances such as butter, which is usually cut into chunks for deposit in the hopper 12, a propeller mechanism is provided to accomplish this purpose. The propeller mechanism comprises, in this instance, a roll 60 of comparatively larger diameter than the conveyor spindles 16—17, and the cylindrical roll 60 extends between the side walls of the hopper 12 for a depth commensurate with the distance between the conveyor fins 20—21 and the top of the hopper 12. The cylindrical roll 60 is preferably provided with arcuate vanes or propeller blades 61 which conform in curvature with the spiral fins 20—21 on the conveyors 16—17, so that as the latter rotate toward each other they will engage the vanes 61 of which a plurality, in this instance four, are uniformly disposed around the periphery of the cylindrical roll 60.

So that the vanes 61 will conform in curvature with the paths of the spiral fins 20—21, these are of compound shape substantially in the form of arcuately diverging blades 62—63 which intersect in the center 64 that is the point of divergence therefor. Consequently, diverging blades 62—63 will respectively be engaged by and mesh with the conveyor fins 20—21 that serve to propel the cylindrical roll 60 in a counterclockwise direction (viewed from Figure 2) in timed relation with the rotation of the conveyor spindles 16—17.

In order to rotatively mount the cylindrical roll 60 in the hopper 12 proximate to the forward end thereof where there usually is a tendency for the substance to accumulate, a shaft 65 extends through the axis of the cylindrical roll 60 to provide projecting extremities 66—67 that are mounted in the side walls of the hopper 12 for journalled support therein. It should be noted that the edible plastic substance which is deposited in the hopper 12 serves as a lubricant between the propeller blades 62—63 and the conveyor fins 20—21, to the end that there is little or no wear on the co-acting parts and the irregular masses of the plastic substances will be engaged by the propeller blades 61 to insure their engagement with the conveyor fins 20—21 for uniform and efficient delivery to and through the die 33. In consequence thereof, manual intervention is unnecessary to insure the proper feeding of irregular masses to the conveyors 16—17 and more uniform feeding is accomplished. This eliminates all physical hazards which are usually incidental to manual intervention, and results in increased production with greater uniformity and density control of the preformed substances.

The compoundly curved propeller blades 62—63 preclude the accumulation of substances in the hopper 12 at its forward end. The substances in chunks would otherwise idle or ride over the conveyors 16—17 without forward movement by reason of the failure to engage the spiral fins or vanes 20—21 thereon. The propeller blades 62—63 will engage the irregular chunks of substance to displace and press them downwardly against the conveyors 16—17 and between the fins or vanes 20—21 for forceful engagement therealong. Thus the irregular chunks of substances will move along the conveyors 16—17 to avoid accumulation in the hopper 12 and avoid clogging the entrance to the conveyors 16—17. The propeller blades 62—63 are compoundly curved substantially as illustrated for opposed dual spiral conveyors 16—17, but are adaptable to a single spiral conveyor by providing a single curved blade or substantially one-half of the compound blades 62—63 extending entirely across the periphery of the cylindrical roller 60. The shape of the blades 62—63 will vary with the pitch and diameter of the fins or vanes 20—21 in the spiral conveyors 16—17. The propeller 60 can be adapted to other types of conveyors and different substances depending upon the dictates of commercial practice, and may be driven through gears and sprockets instead of meshing directly with the conveyors.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In an edible material feeding and printing device having a hopper for receiving plastic material and opposed spiral conveyors for feeding the material in said hopper along a predetermined path, a material propelling member rotatively mounted proximate to one end of the entrance opening in said hopper, and a plurality of circumferentially spaced curved blades on said propelling member to mesh with said opposed spiral conveyors for operation responsive thereto, whereby the plastic material is propelled from said entrance opening of said hopper to said feeding means for transfer therealong without idling thereover for accumulation in said hopper.

2. In an edible plastic material feeding and printing apparatus, the combination with a bulk material receiving hopper, of helical feeding means in communication with said hopper for displacing bulk material therefrom along a predetermined path, cylindrical displacing means in said hopper proximate to one end of the entrance opening therein for supplementing the gravity displacement of bulk material from said hopper into forceful engagement with said feeding means, and circumferentially spaced plural curved blade propelling means extending continuously across and on said cylindrical displacing means to transversely span said hopper for meshing engagement with said helical feeding means to render the former responsive to the latter to insure the feeding displacement thereof and preclude accumulations in said hopper.

3. In a feeding apparatus for plastic material and the like, the combination with a gravity hopper, of double oppositely pitched helical conveyors in communication with said hopper for feeding the plastic material along a predetermined path, a cylindrical member journalled for rotation in said hopper proximate to one end of the entrance opening therein, and material propeller blades on said cylindrical member to mesh with the helical vanes of said conveyors for continuous rotation responsive to said conveyors in displacing the material from said hopper to said conveyors in timed unison with the latter's rotation.

4. In a feeding apparatus of the character mentioned, the combination with a hopper, of a helical conveyor in communication with said hopper for feeding materials along a predetermined path, an elongated member disposed transversely of said helical conveyor, said elongated member being journalled for rotation proximate one end of the entrance opening in said hopper, and a plurality of circumferentially spaced curved blades on said elongated member to mesh with said helical conveyor for operation responsive thereto, whereby the plastic material is propelled from said entrance opening in said hopper to said conveyor for transfer therealong without idling thereover for accumulation in said hopper.

5. In a feeding apparatus for plastic material and the like, the combination with a gravity hopper, of double oppositely pitched helical conveyors in communication with said hopper for feeding the plastic material along a predetermined path, a cylindrical member journalled for rotation in said hopper transversely across said conveyors, and divergently curved material propeller blades on said cylindrical member to mesh with the helical vanes of said conveyors, there being a plural series of circumferentially spaced divergently curved propeller blades on said cylindrical member to insure conveyor meshing engagement with one series of blades before the next series has disengaged therefrom, for continuous rotation responsive to said conveyors, said disengaged blades being free to rotate in the path of the material for displacing the material from said hopper to said conveyors in timed unison with the latter's rotation.

References Cited in the file of this patent

UNITED STATES PATENTS

| Number | Name | Date |
|---|---|---|
| 721,732 | Nance | Mar. 3, 1903 |
| 818,396 | Torres | Apr. 17, 1906 |
| 999,295 | Blue | Aug. 1, 1911 |
| 1,045,184 | Randleman | Nov. 26, 1912 |
| 1,303,356 | Mills | May 13, 1919 |
| 1,570,031 | Baldner | Jan. 19, 1926 |
| 1,683,873 | Doering et al. | Sept. 11, 1928 |
| 1,812,911 | Walter | July 7, 1931 |
| 1,948,021 | Burton | Feb. 20, 1934 |
| 2,127,726 | Goetz | Aug. 23, 1939 |
| 2,321,188 | Doering et al. | June 8, 1943 |
| 2,481,690 | Schaub | Sept. 13, 1949 |